United States Patent [19]
Boutillier et al.

[11] Patent Number: 4,806,582
[45] Date of Patent: Feb. 21, 1989

[54] ADHESIVE COMPOSITIONS

[75] Inventors: Jacques Boutillier, Bernay; Serge Nawrot, Serquigny, both of France

[73] Assignee: Atochem, France

[21] Appl. No.: 10,689

[22] Filed: Feb. 4, 1987

[30] Foreign Application Priority Data

Feb. 12, 1986 [FR] France .................................. 86 01916
Jul. 8, 1986 [FR] France .................................. 86 09929

[51] Int. Cl.$^4$ .......................... C08K 5/58; C08K 5/57; C08K 5/09
[52] U.S. Cl. .................................... 524/178; 523/453; 523/456; 523/459; 524/175; 524/180; 524/382; 524/399; 524/558
[58] Field of Search ............... 524/558, 178, 180, 382, 524/399, 175; 523/453, 459, 456; 428/356, 463; 526/320

[56] References Cited

U.S. PATENT DOCUMENTS

| | | | |
|---|---|---|---|
| 3,300,452 | 1/1967 | Waples | 526/320 |
| 3,904,572 | 9/1975 | Huang et al. | 524/558 |
| 4,094,853 | 6/1978 | Monte et al. | 524/382 |
| 4,292,231 | 9/1981 | Gabriel et al. | 428/356 |
| 4,564,557 | 1/1986 | Ohgushi et al. | 526/320 |

OTHER PUBLICATIONS

The Condensed Chemical Dictionary–Van Nostrand Reinhold Co., 10th edition, p. 762 (1981).

*Primary Examiner*—Veronica P. Hoke
*Attorney, Agent, or Firm*—Sigalos, Levine & Montgomery

[57] ABSTRACT

This invention is directed to an adhesive composition comprising:
(a) a copolymer of ethylene or a mixture of ethylene and another ethylenically unsaturated polymerizable monomer with a hydroxyalkyl ester or an epoxyalkyl ester, and
(b) an organometallic compound of lead, tin, or titanium.

6 Claims, No Drawings

ADHESIVE COMPOSITIONS

BACKGROUND OF THE INVENTION

The present invention relates to adhesive compositions based on copolymers of ethylene and a hydroxyalkyl ester or epoxyalkyl ester containing an organometallic compound.

The adhesive properties of compositions based on a copolymer of ethylene and of an ester of a carboxylic acid with an ethylenic unsaturation or of terpolymers of ethylene, an ester of a carboxylic acid with an ethylenic unsaturation and carboxylic acid or of an ester with an ethylenic unsaturation are known. While generally satisfactory, their resistance to heat is not entirely satisfactory.

SUMMARY OF THE INVENTION

According to the present invention, these properties are clearly improved, in particular in their resistance to heat, when slight quantities of organometallic compounds of lead, tin or titanium are added to them.

Briefly, the present invention is directed to an adhesive composition comprising:

(a) a copolymer of ethylene or a mixture of ethylene and another ethylenically unsaturated polymerizable monomer with a hydroxyalkyl ester or an epoxyalkyl ester, and (b) an organometallic compound of lead, tin, or titanium.

DETAILED DESCRIPTION

The copolymers of ethylene-hydroxyalkyl ester or epoxyalkyl ester entering into the adhesive compositions according to the invention result from the copolymerization of about 60 percent to about 99.5% by weight of ethylene or of a mixture of ethylene with another ethylenically unsaturated polymerizable monomer and of about 0.5 percent to about 40 percent by weight of a hydroxyalkyl ester or of an epoxyalkyl ester of an alpha, beta-ethylenically unsaturated acid of the formula:

$$\begin{array}{c} H\ \ R \\ |\ \ \ | \\ Y-C=C-X \end{array}$$

in which:
(a) R is hydrogen or a methyl group;
(b) X is a $-COO(CHR')_m-(CH_2)_n-Z$, in which
 (i) Z is OH or

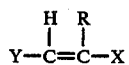

(ii) m is a whole number from 0 to 5,
(iii) n is a whole number from 1 to 6; with m and n being a number from 1 to 6, preferably from 2 to 6 when Z is OH, and
(iv) R' is a hydrocarbon radical, possibly halogenated; and
(c) Y is hydrogen, X or $-COO-CH_2-R'$; X and R' being defined as above.

In the usual case, R' comprises hydrogen and organic radicals containing up to 8 carbon atoms, without however excluding those containing a greater number, if desired. Among these radicals, one can cite methyl, ethyl, propyl, butyl, 2-ethyl hexyl, cyclohexyl, phenyl, tolyl, ethyl phenyl, as well as these same radicals possessing at least one substituted halogen; particularly chlorine.

As used herein, the terms "hydroxyalkyl ester" and "epoxyalkyl ester" mean the esters possessing hydroxyalkyl or epoxyalkyl groups of the formula:

or

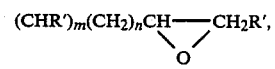

m and n being defined as previously.

The hydroxyalkyl esters or the epoxyalkyl esters of the ethylenically unsaturated acids comprise hydroxyalkylated esters or epoxyalkylated esters of monocarboxylic and dicarboxylic acids such as acrylic acid, alpha substituted acrylic acids and particularly methacrylic acid, maleic acid and fumaric acid.

As ethylenically unsaturated polymerizable monomers which can be associated with the ethylene up to a ratio by weight of 1/1, one can choose for instance from among: the alpha olefins; the aromatic compounds such as the styrene; the alkyl acrylates like ethyl acrylate, n-butyl acrylate and 2-ethyl-hexyl acrylate; the alkyl methacrylates; the acrylic and methacrylic nitriles; the maleic esters like diethyl maleate; the fumaric esters; the esters of unsaturated alcohols like vinyl acetate.

According to the object of the invention, these copolymers, prepared for instance according to the technique described in U.S. Pat. No. 3,300,452, are associated with an organometallic compound of lead, tin or titanium. These organometallic compounds are favorably selected from among the salts of organic acids and, more particularly, from among the salts of organic acids containing up to 25 carbon atoms in their molecule and better still up to 20 carbon atoms. The organometallic compounds of low molecular weight are easily migrating, such as for instance liquid compounds being the best adapted ones, one of their characteristics being an easier and more homogeneous distribution in the copolymer.

Among the more particularly suitable organometallic compounds of lead and tin, one can cite the salts of acids from $C_2$ to $C_{13}$ such as dibutyltin diacetate and dilaurate, lead octoate, lead and tin stearates; the mercaptides like alkyltin thioglycolates and alkyltin mercaptoacetates; the sulfides like alkylated tin sulfides; and the carboxylates.

Particularly recommended among the titanium compounds are the compounds of a general formula of Ti-$(OR)_4$ in which the radicals R, which can be the same or different, represent hydrogen or a hydrocarbon radical containing from 1 to 18 and better still from 1 to 14 carbon atoms. These radicals R preferably are: alkyl, aryl, alkylaryl or cycloaliphatic radicals.

Quantities from 0.05 to 5; and, preferably, from 0.5 to 2; percent by weight, of organometallic compound with respect to the copolymer of ethylene-hydroxyalkyl ester or epoxyalkyl ester are suitable in these adhesive compositions which are customarily used at temperatures generally between the ambient temperature, about 20° C., and 300° C. The particularly recommended adhesive compositions with improved adhesive properties are prepared from copolymers based on ethylene including those mixed with at least one other polymerizable monomer which is ethylenically unsaturated such as, for instance, vinyl acetate or ethyl acrylate, and hydroxyalkyl or epoxyalkyl acrylate or methacrylate. As in the general case these copolymers can contain from 0.5 to 40 percent by weight of polymerization product of hydroxylated or epoxidated acrylate or methacrylate.

The adhesive composition is prepared and used in the usual manner by mixing, in homogeneous manner, the copolymer in the fluid state with the organometallic compound, and then deposited between the substrates to be made to adhere before placing the whole under pressure; from 0.05 to 0.5 MPa is suitable, in the hot state, usually from 150° to 250° C. for about 1 to 60 minutes.

However, the copolymer being in solid form such as a film, granulate, powder or the like can be placed in contact directly with the organometallic compound at the same time as with the substrates to be made to adhere or by prior paste-making at ambient temperature.

These compositions possess good adhesive properties on supports such as metals, glass, and rubbers.

The invention will be further described in connection with the following examples which are set forth for purposes of illustration only.

EXAMPLES 1 TO 32

The evaluation of the adhesive properties is carried out either according to the stripping method at T, ASTM Standard D 1876 or according to the peeling method at 180°, ASTM D 903 on samples prepared as described below.

The particular copolymer used is mixed with the organometallic compound used for 5 minutes at 130° C. in a BRABENDER plastograph provided with a cylinder of type 50 of a volume capacity of about 60 cm³.

The mixture is deposited between the two substrates to be made to adhere, the whole then being placed under a pressure of 0.1 MPa for five minutes at 200° C., except for Example 12 in which the time is one minute.

The particular adhesive compositions and substrates used and the results obtained are given in the following tables.

Examples 1, 3, 5, 7, 13, 15, 17, 19, 23, 25, 27, 29 and 31 are given by way of comparison.

TABLE I

Substrates: Aluminum

| Examples | | Resistance to Stripping peel strength ASTM Standard D 1876 (daN/cm) | | |
|---|---|---|---|---|
| Adhesive Composition | Ratio of the monomers in % by weight | at 20° C. | at 60° C. | at 80° C. |
| 1. E/HEMA | 95/5 | 0.3 | 0.1 | 0 |
| 2. E/HEMA + 1% MBDSn | 95/5 | 0.4 | 0.4 | 0.3 |
| 3. E/EA/HEA | 88/10/2 | 0.5 | 0 | 0 |
| 4. E/EA/HEA + 1% MDBSn | 88/10/2 | 0.3 | 0.4 | 0.7 |
| 5. E/VA/HEA | 72/18/10 | 0.7 | 0.2 | 0 |
| 6. E/VA/HEA + 0.5% MDBSn | 72/18/10 | 3.6 | 0.9 | 0.2 |
| 7. E/VA/HEA | 73/22/5 | 3.6 | 0.7 | 0.1 |
| 8. E/VA/HEA + 0.5 MDBSn | 73/22/5 | 4.9 | 2.1 | 0.4 |
| 9. E/VA/HEA + 1% DADBSn | 73/22/5 | 2.0 | 2.0 | 1.0 |
| 10. E/VA/HEA + 1% DLDBSn | 73/22/5 | 5.2 | 2.3 | 0.2 |
| 11. E/VA/HEA + 1% DB 30 | 73/22/5 | 0.5 | 0.5 | 0.6 |
| 12. E/VA/HEA + 1% Ti(OPr)₄ | 73/22/5 | 5.9 | 1.3 | 0.1 |

In Tables I, II and IV:
E/HEMA - Copolymer of ethylene/hydroxyethyl methacrylate
E/EA/HEA - Terpolymer of ethylene/ethyl acrylate/hydroxyethyl acrylate
E/VA/HEA - Terpolymer of ethylene/vinyl acetate/hydroxyethyl acrylate
MDBSn - Dibutyltin maleate
Ti(OPr)₄ - Tetraisopropyl orthotitanate
DLDBSn - Dibutyltin dilaurate
DADBSn - Dibutyltin diacetate
DB 30 - Dibasic lead stearate

TABLE II

| Examples | | Resistance to Stripping peel strength ASTM Standard D 903 (daN/cm) | | |
|---|---|---|---|---|
| Adhesive Composition | Ratio of the monomers in % by weight | at 20° C. | at 60° C. | at 80° C. |
| Substrate: Glass | | | | |
| 13. E/VA/HEA | 73/22/5 | 4.2 | 1.0 | 0.1 |
| 14. E/VA/HEA + 0.5% MDBSn | 73/22/5 | 5.0 | 4.5 | 0.9 |
| Substrate: Painted Sheet Metal | | | | |
| 15. E/VA/HEA | 73/22/5 | 3.8 | 1.1 | 0.2 |
| 16. E/VA/HEA + 0.5% MDBSn | 73/22/5 | 5.6 | 2.4 | 0.5 |

TABLE III

Substrates: Aluminum

| Examples | | Resistance to Stripping peel strength ASTM Standard D 1876 (daN/cm) | | |
|---|---|---|---|---|
| Adhesive Composition | Ratio of the monomers in % by weight | at 20° C. | at 60° C. | at 80° C. |
| 17. E/GMA | 85/15 | 1.6 | 0.6 | 0.4 |
| 18. E/GMA + 0.5% MBDSn | 85/15 | 4.8 | 4.5 | 3.3 |
| 19. E/VA/GMA | 68/27/5 | 4.4 | 0.6 | 0 |
| 20. E/VA/GMA + 0.5% MDBSn | 68/27/5 | 3.6 | 1.1 | 0.2 |
| 21. E/VA/GMA + 0.5% DB30 | 68/27/5 | 1.6 | 0.9 | 0.3 |
| 22. E/VA/GMA + 0.5% DLDBSn | 68/27/5 | 3.8 | 1.5 | 0.3 |
| 23. E/VA/GMA | 90/5/5 | 2.2 | 1.3 | 0.6 |
| 24. E/VA/GMA + 0.5 MDBSn | 90/5/5 | 3.8 | 2.5 | 3.0 |

In Tables III and IV:
E/GMA - Copolymer of Ethylene/glycidyl methacrylate
E/VA/GMA - Terpolymer of Ethylene/vinyl acetate/glycidyl methacrylate

TABLE IV

| Examples | | Resistance to Stripping peel strength ASTM Standard D 903 (daN/cm) | | |
|---|---|---|---|---|
| Adhesive Composition | Ratio of the monomers in % by weight | at 20° C. | at 60° C. | at 80° C. |
| Substrate - Painted Sheet Metal | | | | |
| 25. E/VA/GMA | 68/27/5 | 3.4 | 0.4 | 0 |

TABLE IV-continued

| Examples | | Resistance to Stripping peel strength ASTM Standard D 903 (daN/cm) | | |
|---|---|---|---|---|
| Adhesive Composition | Ratio of the monomers in % by weight | at 20° C. | at 60° C. | at 80° C. |
| 26. E/VA/GMA + 0.5% MDBSn | 68/27/5 | 3.2 | 0.6 | 0.2 |
| Substrate - Glass | | | | |
| 27. E/VA/GMA | 68/27/5 | 3.2 | 0.5 | 0 |
| 28. E/VA/GMA + 0.5% MDBSn | 68/27/5 | 2.4 | 1.3 | 0.3 |
| Substrate - Bare Steel Sheet Metal | | | | |
| 29. E/VA/GMA | 68/27/5 | 3.3 | 0.4 | 0 |
| 30. E/VA/GMA + 0.5% MDBSn | 68/27/5 | 3.5 | 1.0 | 0.3 |
| Substrate - Coated Sheet Metal Cataphoresis | | | | |
| 31. E/VA/GMA | 68/27/5 | 3.3 | 0.2 | 0 |
| 32. E/GMA + 0.5% MDBSn | 68/27/5 | 3.0 | 0.5 | 0.1 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention.

We claim:

1. An adhesive composition comprising:
   a. a copolymer resulting from the copolymerization of about 66% to about 99.5% by weight of ethylene or a mixture of ethylene and another ethylenically saturated polymerizable monomer with correspondingly about 0.5% to 40% by weight of a hydroxyalkyl ester or an epoxyalkyl ester of the formula:

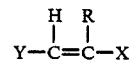

in which:
(a) R is hydrogen or a methyl group;
(b) X is a $-COO-(CHR')_m-(CH_2)_n-Z$, in which
   (i) Z is OH or

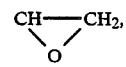

(ii) m is a whole number from 0 to 5,
   (iii) n is a whole number from 1 to 6; with m and n being a number from 1 to 6, and
   (iv) R' is a hydrocarbon radical, possibly halogenated; and
(c) Y is hydrogen, X or $-COO-CH_2-R'$; X and R' being defined as above, and
   b. a compound of lead or tin selected from the mercaptides, sulfides, or carboxylates thereof, in an amount from about 0.05 to 5% by weight with respect to the weight of said copolymer.

2. The composition of claim 1, wherein the compound (b) is an organic acid salt of lead or tin.

3. The composition of claim 2, wherein the organic acid salt contains up to 25 carbon atoms.

4. The composition of claim 3, wherein the compound (b) is selected from dibutyltin diacetate, dibutyltin dilaurate, lead octoate, lead stearate, tin stearate, or mixtures thereof.

5. The composition of claims 1, 2, 3, or 6, wherein there is present from about 0.05 to 5 parts by weight of said compound (b) and correspondingly 99.95 to 95 parts by weight of said copolymer (a).

6. The composition of claim 1, wherein said ethylenically unsaturated polymerizable monomer is selected from hydroxyalkyl acrylate or methacrylate, epoxyalkyl acrylate or methacrylate, vinyl acetate, or ethyl acrylate.

* * * * *